United States Patent
Jung

(10) Patent No.: US 11,840,220 B2
(45) Date of Patent: Dec. 12, 2023

(54) DRIVER ASSISTANCE SYSTEM AND CONTROL METHOD THEREOF

(71) Applicant: MANDO CORPORATION, Pyeongtaek-si (KR)

(72) Inventor: Wonsik Jung, Seongnam-si (KR)

(73) Assignee: HL Klemove Corp., Incheon (KR)

( * ) Notice: Subject to any disclaimer, the term of this patent is extended or adjusted under 35 U.S.C. 154(b) by 202 days.

(21) Appl. No.: 17/126,529

(22) Filed: Dec. 18, 2020

(65) Prior Publication Data

US 2021/0188260 A1    Jun. 24, 2021

(30) Foreign Application Priority Data

Dec. 20, 2019    (KR) .......................... 10-2019-0172282

(51) Int. Cl.
| | | |
|---|---|---|
| *B60W 30/09* | (2012.01) | |
| *B60W 30/095* | (2012.01) | |
| *B60W 10/20* | (2006.01) | |
| *B60W 30/14* | (2006.01) | |
| *B60W 10/18* | (2012.01) | |

(52) U.S. Cl.
CPC ............ *B60W 30/09* (2013.01); *B60W 10/20* (2013.01); *B60W 30/0956* (2013.01);
(Continued)

(58) Field of Classification Search
CPC .. B60W 30/09; B60W 10/20; B60W 30/0956; B60W 30/143; B60W 10/18;
(Continued)

(56) References Cited

U.S. PATENT DOCUMENTS 10,372,131 B2 * 8/2019 Alvarez Rodriguez ..................... G05D 1/0094
11,377,103 B2 * 7/2022 Okabe ................... B60W 30/10
(Continued)

FOREIGN PATENT DOCUMENTS

KR    20170068062 A    6/2017

OTHER PUBLICATIONS

Tang, Samuel Jia Wei, et al. "Real-time lane detection and rear-end collision warning system on a mobile computing platform." 2015 IEEE 39th Annual Computer Software and Applications Conference. vol. 2. IEEE, 2015. (Year: 2015).*
(Continued)

*Primary Examiner* — Russell Frejd
*Assistant Examiner* — Ana D Thomas
(74) *Attorney, Agent, or Firm* — Morgan, Lewis & Bockius LLP

(57) ABSTRACT

A driver assistance system according to an embodiment of present disclosure includes: a camera disposed on the vehicle to have an external field of view of a vehicle and configured to obtain image data; a radar disposed on the vehicle to have a field of sensing outside the vehicle and configured to obtain radar data; and a controller including a processor configured to process the image data and the radar data, and the controller is configured to determine whether a rear vehicle changes direction based on the image data obtained by the camera, determine whether there is a risk of collision with the rear vehicle based on the radar data when the rear vehicle does not change direction and control at least one of a steering system or a vehicle velocity control system of the vehicle to avoid the rear vehicle when it is determined that there is a risk of collision with the rear vehicle.

18 Claims, 11 Drawing Sheets

(52) U.S. Cl.
CPC ........... *B60W 30/143* (2013.01); *B60W 10/18* (2013.01); *B60W 2420/42* (2013.01); *B60W 2420/52* (2013.01); *B60W 2552/00* (2020.02); *B60W 2554/20* (2020.02); *B60W 2554/4026* (2020.02); *B60W 2554/4029* (2020.02)

(58) Field of Classification Search
CPC ......... B60W 2420/42; B60W 2420/52; B60W 2552/00; B60W 2554/20; B60W 2554/4026; B60W 2554/4029; B60W 2554/4041; B60W 2554/804; B60W 30/08; B60W 40/02; B60W 40/105; B60W 2520/10; B60W 2554/801; B60R 11/04; G01S 13/931; B60Y 2300/08
See application file for complete search history.

(56) References Cited

U.S. PATENT DOCUMENTS

| | | | |
|---|---|---|---|
| 2012/0296522 A1* | 11/2012 | Otuka | B60W 30/12 701/41 |
| 2017/0001636 A1 | 1/2017 | Laur et al. | |
| 2018/0118204 A1* | 5/2018 | Ito | G06F 18/256 |
| 2019/0315345 A1* | 10/2019 | Newman | B60W 50/14 |

OTHER PUBLICATIONS

Song, Wenjie, et al. "Lane detection and classification for forward collision warning system based on stereo vision." IEEE Sensors Journal 18.12 (2018): 5151-5163. (Year: 2018).*

* cited by examiner

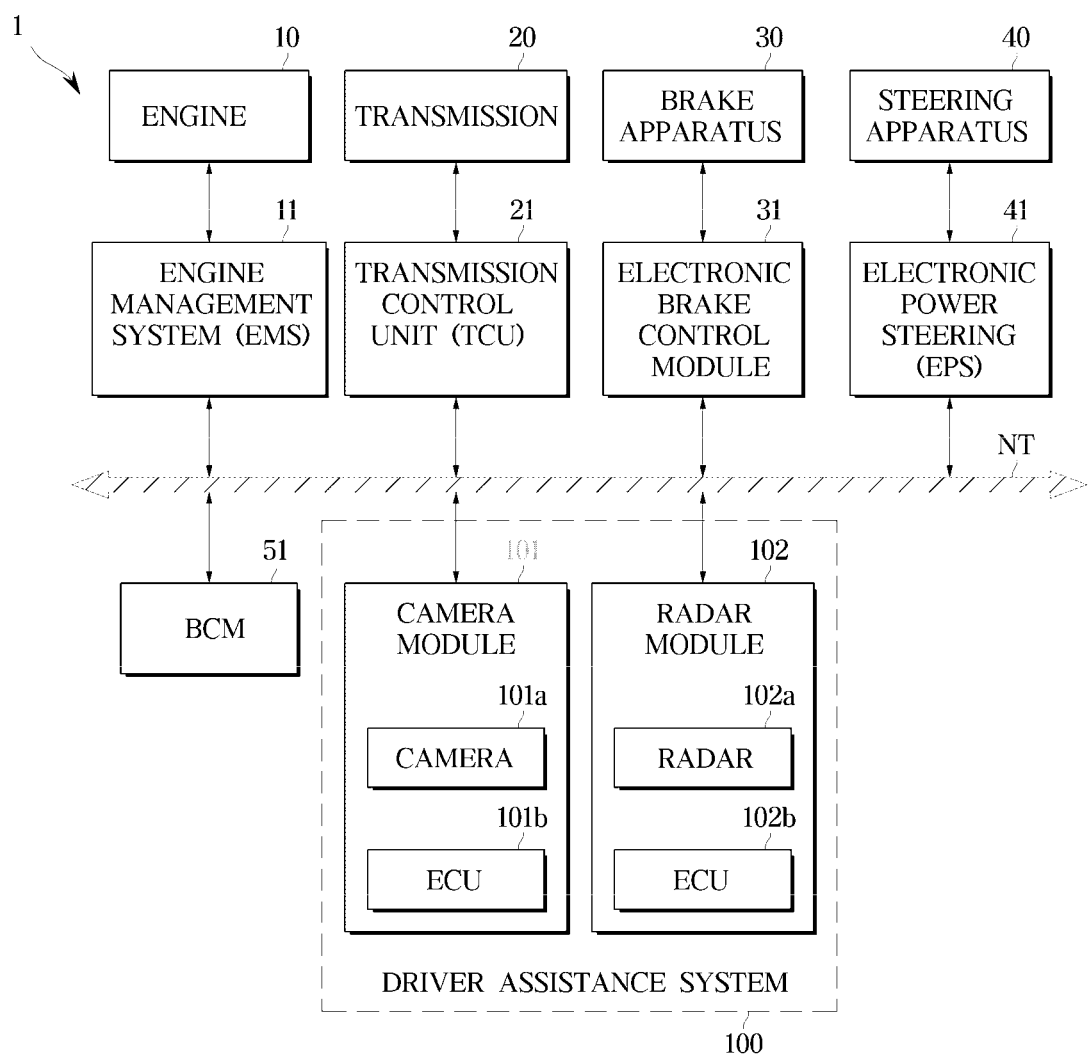
<FIG 1>

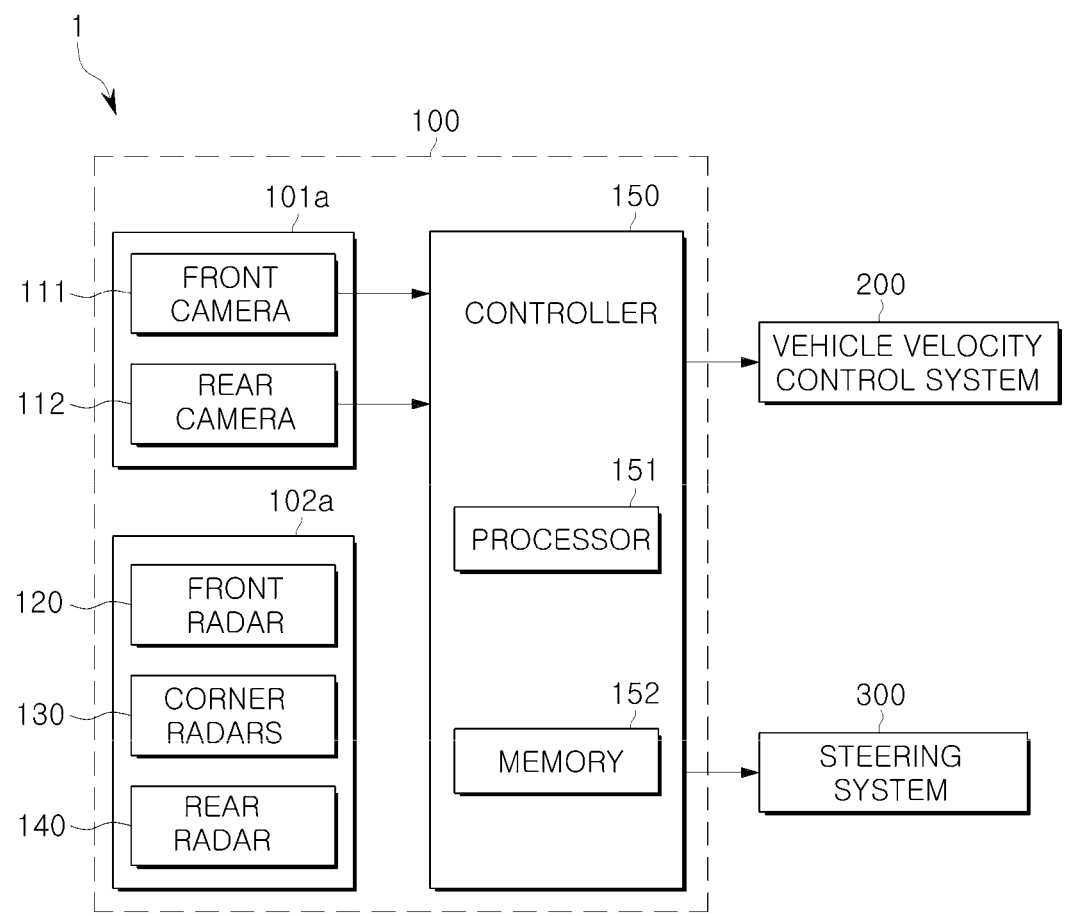
<FIG 2>

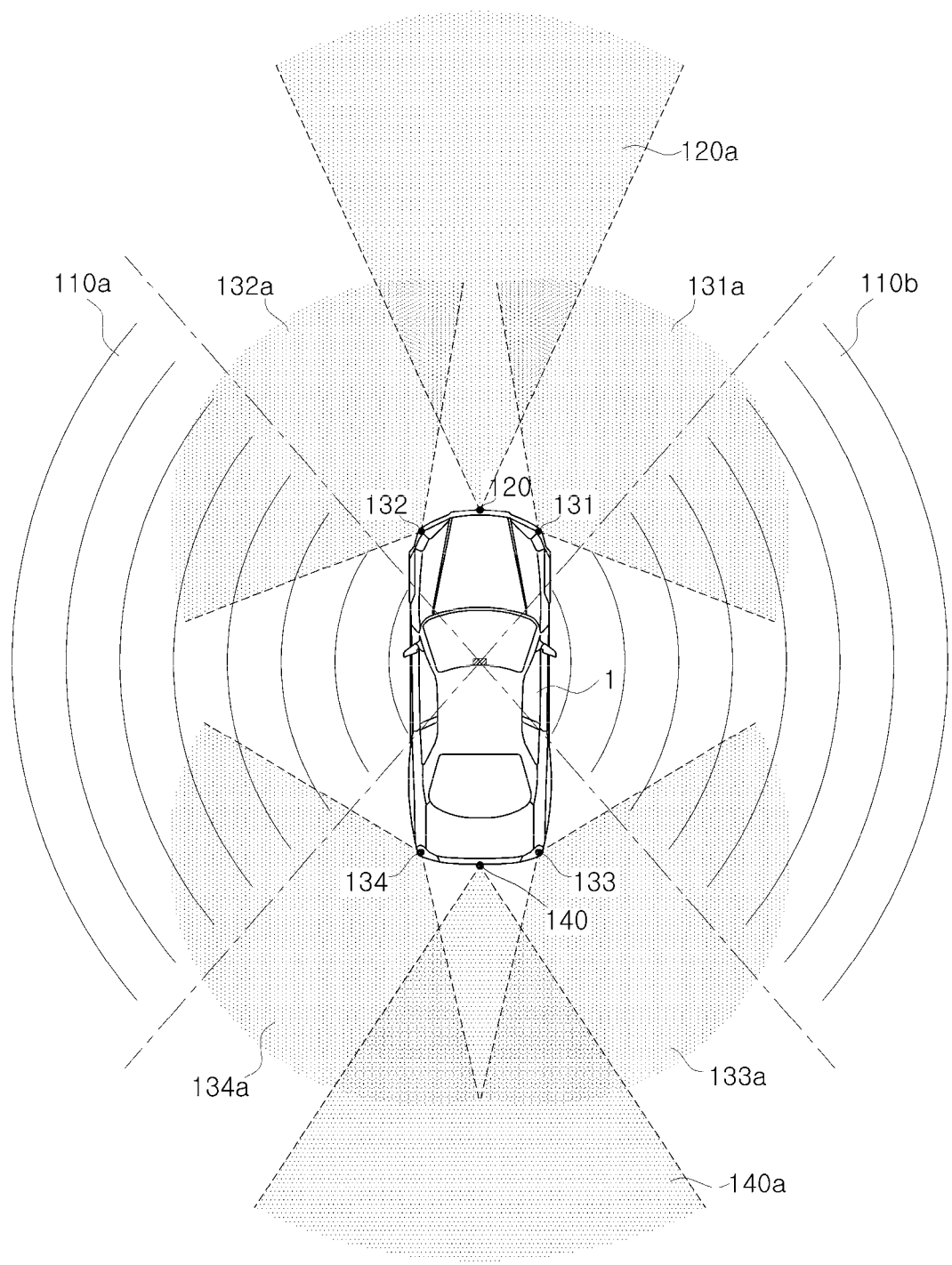
<FIG 3>

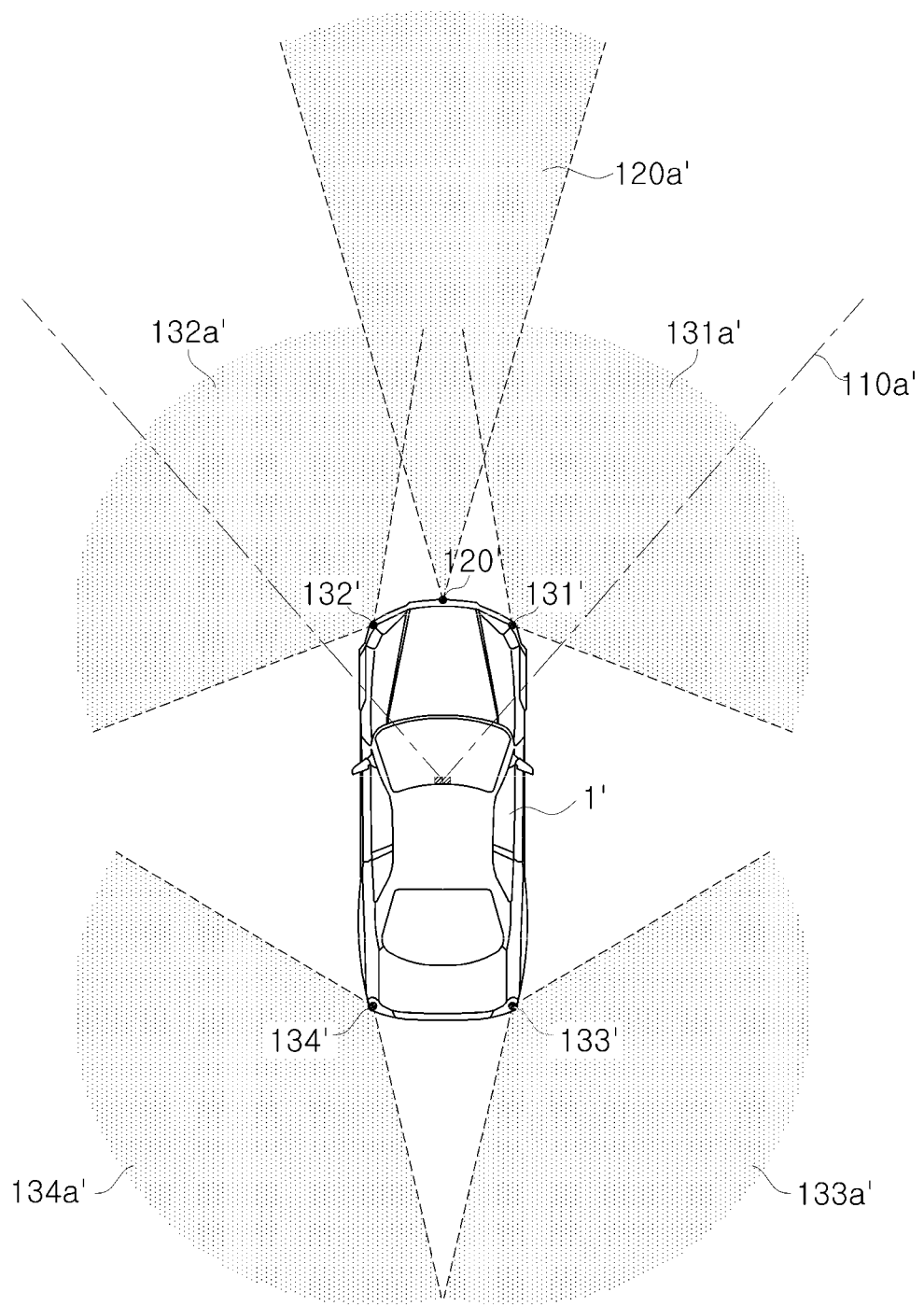
<FIG 4>

<FIG 5>
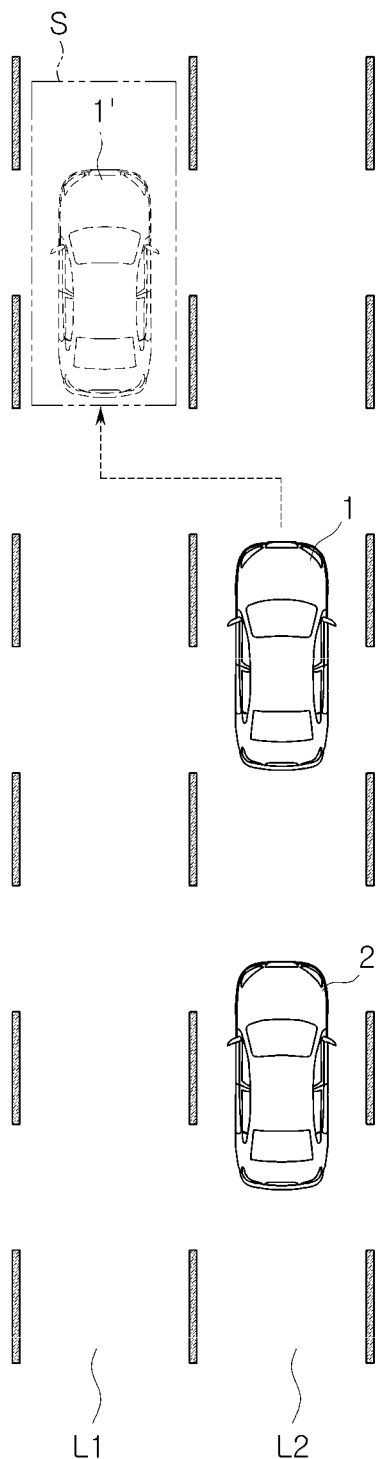

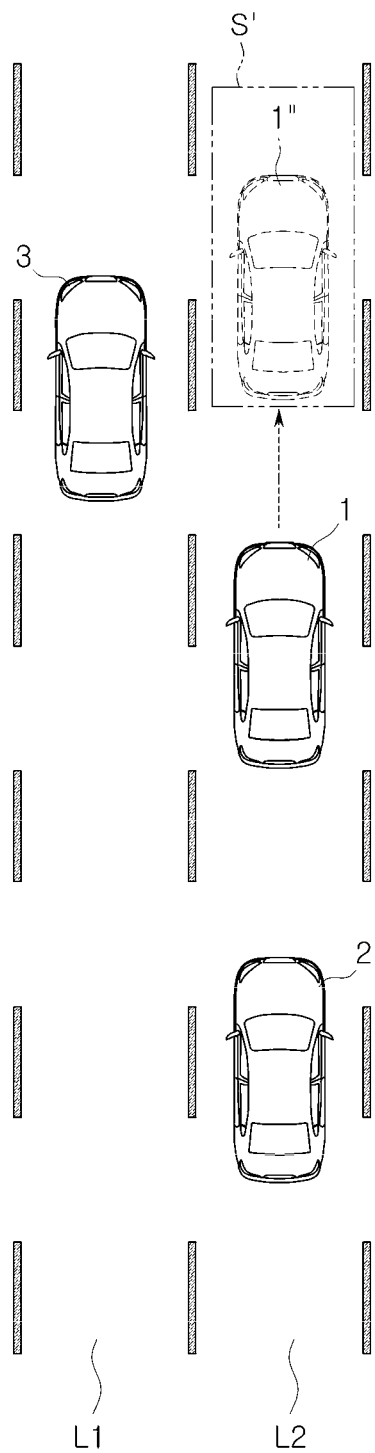
<FIG 6>

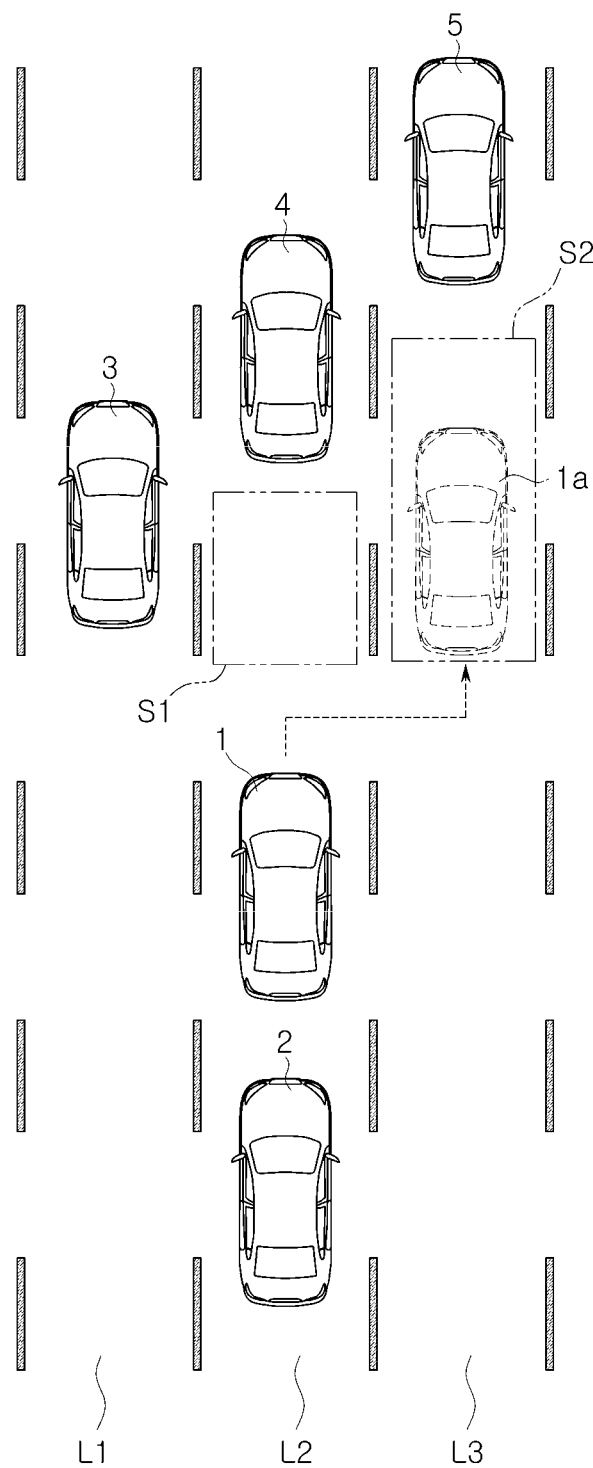
<FIG 7>

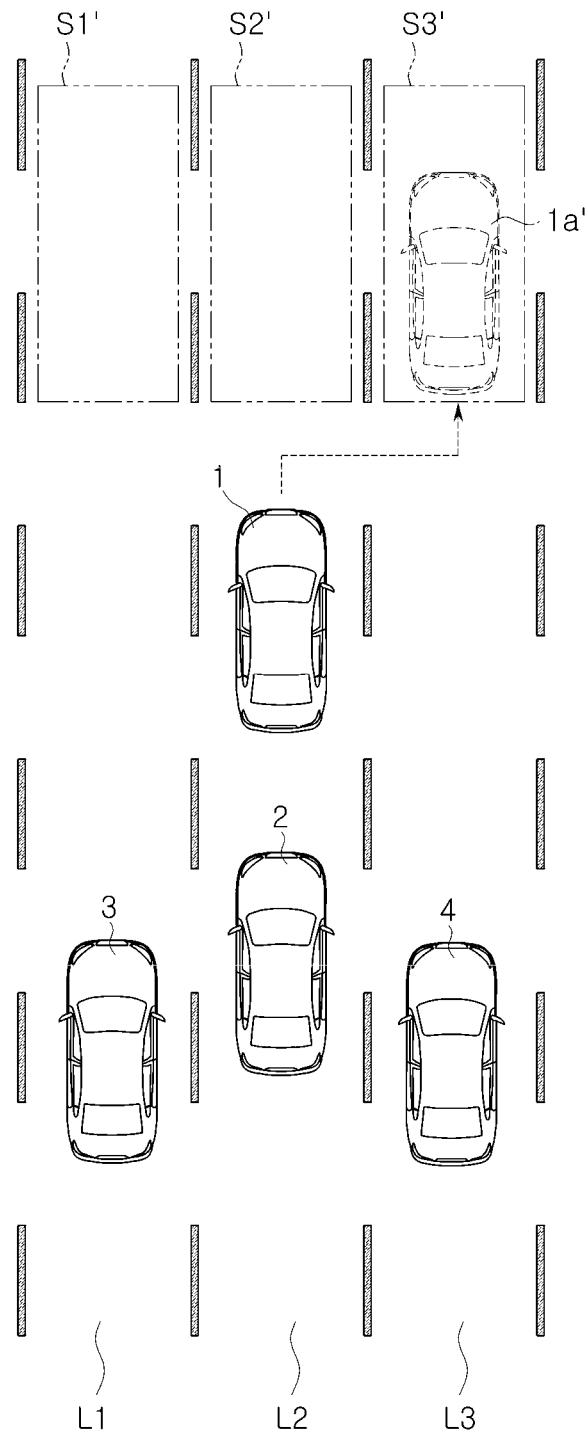
<FIG 8>

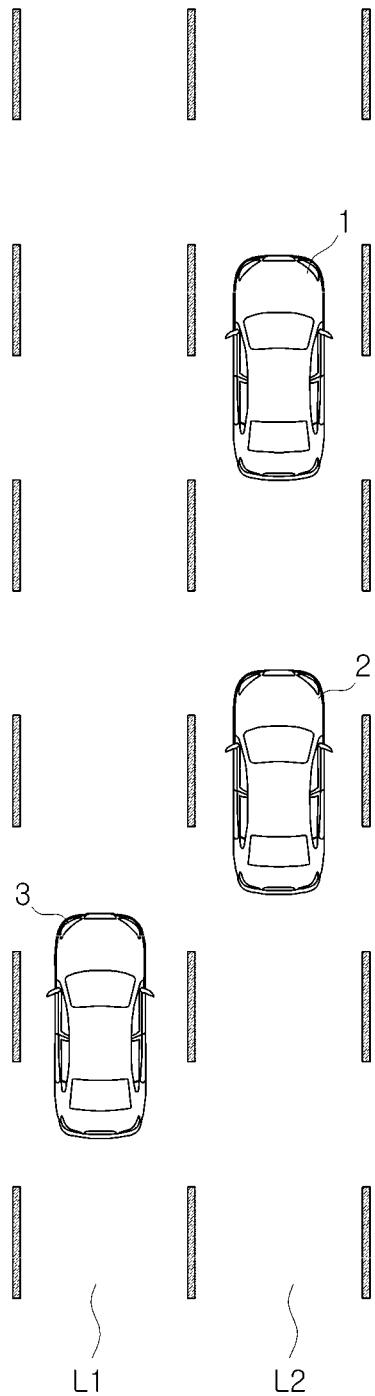
<FIG 9>

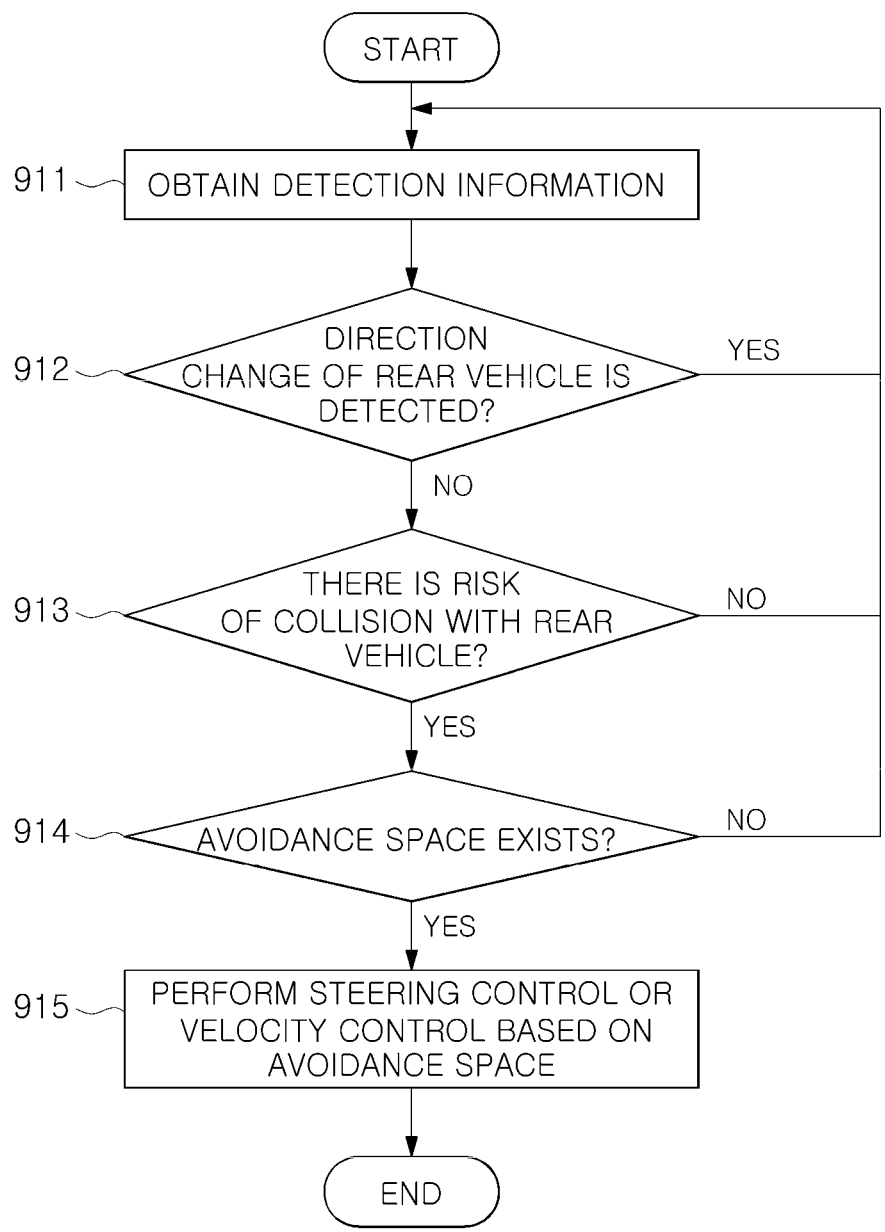

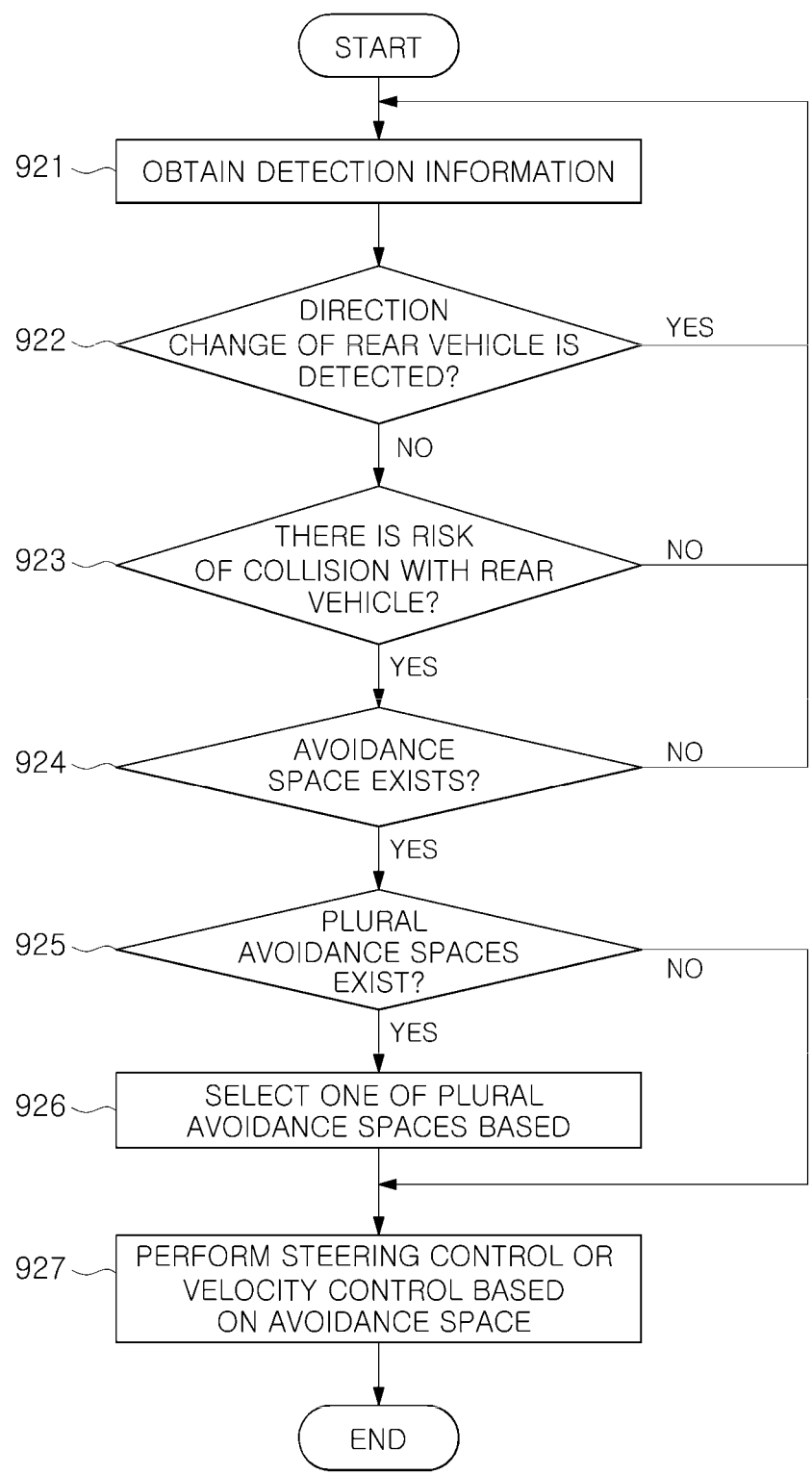

DRIVER ASSISTANCE SYSTEM AND CONTROL METHOD THEREOF

CROSS-REFERENCE TO RELATED APPLICATION

This application is based on and claims priority under 35 U.S.C. § 119 to Korean Patent Application No. 10-2019-0172282, filed on Dec. 20, 2019 in the Korean Intellectual Property Office, the disclosure of which is incorporated herein by reference.

BACKGROUND

1. Field

The present disclosure relates to a driver assistance system, and more particularly, to a driver assistance system capable of avoiding a collision with surrounding objects in a driving situation, and a control method thereof.

2. Description of the Related Art

Generally, a vehicle refers to a movement device or transportation device, designed to travel on a road or railway using fossil fuel, electric power, and the like as a power source. The vehicle may move to various positions mainly using one or more wheels installed on the vehicle body. Such a vehicle may include a three-wheeled or four-wheeled vehicle, a two-wheeled vehicle, such as a motorcycle, a construction machine, a bicycle, and a train traveling on a railway arranged on a track.

Recently, there have been active studies on a vehicle equipped with an advanced driver assist system (ADAS), which actively provides information about the state of a vehicle, the state of a driver, and the surrounding environment to reduce the burden on the driver while enhancing the convenience of the driver. Such a system may determine a risk of collision with an object in a driving situation of a vehicle, and provide collision avoidance and warning through emergency braking in a crash situation.

SUMMARY

An aspect provides a driver assistance system capable of recognizing information on nearby objects existing in a near or far distance in a driving situation of a vehicle and avoiding a collision with surrounding objects, and a control method thereof.

Therefore, it is an aspect of the present disclosure to provide a driver assistance system including: a camera disposed on the vehicle to have an external field of view of a vehicle and configured to obtain image data; a radar disposed on the vehicle to have a field of sensing outside the vehicle and configured to obtain radar data; and a controller including a processor configured to process the image data and the radar data, and the controller is configured to determine whether a rear vehicle changes direction based on the image data obtained by the camera, determine whether there is a risk of collision with the rear vehicle based on the radar data when the rear vehicle does not change direction and control at least one of a steering system or a vehicle velocity control system of the vehicle to avoid the rear vehicle when it is determined that there is a risk of collision with the rear vehicle.

The controller may be configured to identify an avoidance space for avoiding a collision with the rear vehicle based on at least one of the image data or the radar data when it is determined that there is a risk of collision with the rear vehicle and control at least one of the steering system or the vehicle velocity control system of the vehicle so that the vehicle moves to the identified avoidance space.

The controller may be configured to determine the steering time point based on the relative velocity of the rear vehicle driving the adjacent lane when the avoidance space exists in the adjacent lane and control the steering system of the vehicle based on the determined steering time point.

The controller may be configured to select one of the plurality of avoidance spaces based on detection information obtained based on at least one of the image data or the radar data when the identified avoidance space is plural and control at least one of the steering system or the vehicle velocity control system of the vehicle so that the vehicle moves to the selected avoidance space.

The controller may be configured to select one of the plurality of avoidance spaces based on at least one of the size of the identified avoidance space included in the detection information, the distance between the preceding vehicle and the vehicle, the velocity of the preceding vehicle, the distance between the rear vehicle and the vehicle or the velocity of the rear vehicle.

The controller may be configured to detect the on or off state of the direction indicator of the rear vehicle based on the image data and determine that the rear vehicle does not change direction when the direction indicator of the rear vehicle is off state.

The controller may be configured to determine that there is a risk of collision with the rear vehicle when the position or relative velocity of the rear vehicle obtained based on the radar data satisfies a predetermined condition.

The camera may include a rear camera disposed on the vehicle to have a rear field of view.

The radar may include a rear radar disposed on the vehicle to have a rear field of sensing.

It is another aspect of the present disclosure to provide a control method of a driver assistance system mounted on a vehicle, the method includes: obtaining image data by a camera disposed on the vehicle to have an external field of view of a vehicle; obtaining radar data by a radar disposed on the vehicle to have a field of sensing outside the vehicle; processing the image data and the radar data; determining whether a rear vehicle changes direction based on the image data; determining whether there is a risk of collision with the rear vehicle based on the radar data when the rear vehicle does not change direction; and controlling at least one of a steering system or a vehicle velocity control system of the vehicle to avoid the rear vehicle when it is determined that there is a risk of collision with the rear vehicle.

The controlling at least one of a steering system or a vehicle velocity control system may include: identifying an avoidance space for avoiding a collision with the rear vehicle based on at least one of the image data or the radar data when it is determined that there is a risk of collision with the rear vehicle; and controlling at least one of the steering system or the vehicle velocity control system of the vehicle so that the vehicle moves to the identified avoidance space.

The controlling at least one of the steering system or the vehicle velocity control system of the vehicle so that the vehicle moves to the identified avoidance space may include: determining the steering time point based on the relative velocity of the rear vehicle driving the adjacent lane when the avoidance space exists in the adjacent lane; and controlling the steering system of the vehicle based on the determined steering time point.

The controlling at least one of the steering system or the vehicle velocity control system of the vehicle so that the vehicle moves to the identified avoidance space may include: selecting one of the plurality of avoidance spaces based on detection information obtained based on at least one of the image data or the radar data when the identified avoidance space is plural; and controlling at least one of the steering system or the vehicle velocity control system of the vehicle so that the vehicle moves to the selected avoidance space.

The selecting one of the plurality of avoidance spaces may include: selecting one of the plurality of avoidance spaces based on at least one of the size of the identified avoidance space included in the detection information, the distance between the preceding vehicle and the vehicle, the velocity of the preceding vehicle, the distance between the rear vehicle and the vehicle or the velocity of the rear vehicle.

The determining whether a rear vehicle changes direction may include: detecting the on or off state of the direction indicator of the rear vehicle based on the image data; and determining that the rear vehicle does not change direction when the direction indicator of the rear vehicle is off state.

The determining whether there is a risk of collision with the rear vehicle may include: determining that there is a risk of collision with the rear vehicle when the position or relative velocity of the rear vehicle obtained based on the radar data satisfies a predetermined condition.

BRIEF DESCRIPTION OF THE DRAWINGS

These and/or other aspects of the disclosure will become apparent and more readily appreciated from the following description of the embodiments, taken in conjunction with the accompanying drawings of which:

FIG. 1 is a diagram illustrating a configuration of a vehicle according to an embodiment;

FIG. 2 is a diagram illustrating a configuration of a driver assistance system according to an embodiment;

FIG. 3 is a diagram illustrating a camera and a radar included in a driver assistance system of a vehicle according to an embodiment;

FIG. 4 illustrates a camera and a radar included in a conventional driver assistance system.

FIGS. 5 to 9 are diagrams for illustrating an operation for avoiding a collision with a nearby object by the driver assistance system according to an embodiment.

FIGS. 10 and 11 are flowcharts illustrating a control method of a driver assistance system according to an embodiment.

DETAILED DESCRIPTION

Like numerals refer to like elements throughout the specification. Not all elements of embodiments of the present disclosure will be described, and description of what are commonly known in the art or what overlap each other in the embodiments will be omitted. The terms as used throughout the specification, such as part", module", member", block", etc., may be implemented in software and/or hardware, and a plurality of parts", modules", members", or blocks" may be implemented in a single element, or a single part", module", member", or block" may include a plurality of elements.

It will be further understood that the term "connect" or its derivatives refer both to direct and indirect connection, and the indirect connection includes a connection over a wireless communication network.

It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof, unless the context clearly indicates otherwise.

Further, when it is stated that one member is "on" another member, the member may be directly on the other member or a third member may be disposed therebetween.

Although the terms "first," "second," "A," "B," etc. may be used to describe various components, the terms do not limit the corresponding components, but are used only for the purpose of distinguishing one component from another component.

As used herein, the singular forms "a," "an" and "the" are intended to include the plural forms as well, unless the context clearly indicates otherwise.

Reference numerals used for method steps are just used for convenience of explanation, but not to limit an order of the steps. Thus, unless the context clearly dictates otherwise, the written order may be practiced otherwise.

Hereinafter, the principles and embodiments of the disclosure will be described with reference to the accompanying drawings.

FIG. 1 is a block diagram illustrating a configuration of a vehicle according to an embodiment.

Referring to FIG. 1, a vehicle 1 includes an engine 10, a transmission 20, a braking device 30, and a steering device 40. The engine 10 may include a cylinder and a piston, and generate power required for the vehicle 1 to travel. The transmission 20 may include a plurality of gears, and transmit the power generated by the engine 10 to wheels. The braking device 30 may decelerate or stop the vehicle 1 through friction with the wheels. The steering device 40 may change the heading direction of the vehicle 1.

The vehicle 1 may include a plurality of machine parts. For example, the vehicle 1 may include an engine management system (EMS) 11, a transmission control unit (TCU) 21, an electronic brake control module (EBCM) 31, an electronic power steering (EPS) 41, a body control module (BCM) 51, and a driver assistance system (DAS) 100.

The EMS 11 may control the engine 10 in response to an acceleration intention of the driver through an accelerator pedal or a request of the DAS 100. For example, the EMS 11 may control the torque of the engine 10.

The TCU 21 may control the transmission 20 in response to a shift command of the driver through a shift lever and/or a travelling speed of the vehicle 1. For example, the TCU 21 may adjust the gear ratio of the engine 10 to the wheels.

The EBCM 31 may control the braking device 30 in response to a braking intention of the driver through a braking pedal and/or a slip of the wheels. For example, the EBCM 31 may temporarily release the braking of the wheels in response to a slip of the wheels sensed at a time of braking the vehicle 1 (anti-lock braking systems: ABS). The EBCM 31 may selectively release braking of the wheels in response to over-steering and/or under-steering sensed at a time of steering the vehicle 1 (electronic stability control: ESC). In addition, the EBCM 31 may temporarily brake the wheels in response to a slip of the wheels sensed at a time of driving the vehicle 1 (traction control system: TCS).

The EPS 41 may assist the operation of the steering device 40 in response to a steering intention of the driver through the steering wheel such that the driver may easily operate the steering wheel. For example, the EPS 41 may assist the operation of the steering device 40 such that the steering force is reduced during low-speed travelling or parking and the steering force is increased during high-speed travelling.

The BCM 51 may control the operation of machine parts that provide convenience to the driver or ensure the safety of the driver. For example, the BCM 51 may control a head lamp, a wiper, a cluster, a multifunction switch, a direction indicator lamp, and the like.

The DAS 100 may assist the driver in manipulating (driving, braking, and steering) the vehicle 1. For example, the DAS 100 may sense a surrounding environment of the vehicle 1 (e.g., another vehicle, a pedestrian, a cyclist, a lane, a road sign, and the like), and control driving and/or braking and/or steering of the vehicle 1 in response to the sensed environment.

The DAS 100 may provide the driver with various functions. For example, the DAS 100 may include a lane departure warning (LDW), a lane keeping assist (LKA), a high beam assist (HBA), an automatic emergency braking (AEB), an autonomous emergency steering (AES), a traffic sign recognition (TSR), a smart cruise control (SCC), a blind spot detection (BSD), and the like.

The DAS 100 includes a camera module 101 that obtains image data of the surrounding of the vehicle 1 and a radar module 102 that obtains object data of the surrounding of the vehicle 1. The camera module 101 may include a camera 101*a* and an electronic control unit (ECU) 101*b*, and photograph at least one of the front or the lateral side of the vehicle 1 and recognize another vehicle, a pedestrian, a cyclist, a lane, a road sign, and the like. The radar module 102 may include a radar 102*a* and an ECU 102*b*, and obtain a relative position, a relative velocity, and the like of an object of the surrounding of the vehicle 1 (e.g., another vehicle, a pedestrian, a cyclists, and the like).

The above described electronic components may communicate with each other through vehicle communication network NT. For example, the machine parts may transmit data through Ethernet, media oriented systems transport (MOST), Flexray, controller area network (CAN), local interconnect network (LIN), and the like. For example, the DAS 100 may transmit a driving control signal, a braking signal, and a steering signal to the EMS 11, the EBCM 31, and the EPS 41, respectively.

FIG. 2 is a diagram illustrating a configuration of a driver assistance system according to an embodiment. FIG. 3 is a diagram illustrating a camera and a radar included in a driver assistance system of a vehicle according to an embodiment.

Referring to FIG. 2, the vehicle 1 may include a vehicle velocity control system 200, a braking system 32, a steering system 300, and a DAS 100.

The vehicle velocity control system 200 may include at least one component for increasing or decreasing the vehicle velocity of the vehicle 1. The vehicle velocity control system 200 includes the EBCM (31 in FIG. 1) and the braking device (30 in FIG. 1) described with reference to FIG. 1. In addition, the vehicle velocity control system 200 includes the engine (10 in FIG. 1), the EMS (11 in FIG. 1), the transmission (20 in FIG. 1), and the TCU (21 in FIG. 1).

The steering system 300 may include the EPS (41 in FIG. 1) and the steering device (40 in FIG. 1).

The DAS 100 may include a front camera 111, a rear camera 112, a front radar 120, a plurality of corner radars 130, and a rear radar 140.

The front camera 111 may photograph the front of the vehicle 1 and obtain image data of the front of the vehicle 1. The image data of the front of the vehicle 1 may include position information of another vehicle, a pedestrian, a cyclist, or a lane existing in front of the vehicle 1.

In addition, as shown in FIG. 3, the front camera 111 may have a field of view 110*a* and 110*b* facing not only the front of the vehicle 1 but also toward the side of the vehicle 1.

The front camera 111 may obtain external image data around the vehicle 1 including visual information on the side of the vehicle 1 as well as the front of the vehicle 1. The external image data of the vehicle 1 may include position information about another vehicle, pedestrian, cyclist, or lane located in at least one of the front or side of the vehicle 1.

The front camera 111 may include a plurality of lenses and an image sensor. The image sensor may include a plurality of photodiodes for converting light into electrical signals, and the plurality of photodiodes may be arranged in a two-dimensional matrix.

The front camera 111 may be electrically connected to the controller 150. For example, the front camera 111 may be connected to the controller 150 through a vehicle communication network NT, may be connected to the controller 150 through a hard wire, or may be connected to the controller 150 through a printed circuit board (PCB).

The front camera 111 may transmit external image data around the vehicle 1 including at least one of the front or the side of the vehicle 1 to the controller 150.

Meanwhile, the front camera 111 may be installed at a position to have a front view or a side view of the vehicle 1, and may be installed, for example, on a front windshield of the vehicle 1.

The rear camera 112 may photograph the rear of the vehicle 1 and obtain image data of the rear of the vehicle 1. The image data of the rear of the vehicle 1 may include position information on another vehicle or pedestrian or cyclist or lane located at the rear of the vehicle 1.

The rear camera 112 may obtain external image data around the vehicle 1 including visual information about the side of the vehicle 1 as well as the rear of the vehicle 1. The external image data of the vehicle 1 may include position information about another vehicle, a pedestrian, a cyclist, or a lane positioned at least one of the rear or side of the vehicle 1.

To this end, the rear camera 112 may be installed at a position to have a rear view or a side view of the vehicle 1. For example, it may be installed on the rear windshield of the vehicle 1.

In addition, the description of the front camera 111 described above may be equally applied to the rear camera 112.

The front radar 120 may include a transmission antenna (or a transmission antenna array) that radiates transmission radio waves forward of the vehicle 1 and a reception antenna (or a reception antenna array) that receives reflected radio waves reflected from an object. The front radar 120 may obtain front radar data from the transmission radio waves transmitted by the transmission antenna and the reflected radio waves received by the reception antenna. Front radar data may include distance information and velocity information regarding another vehicle, a pedestrian, or a cyclist existing in front of the vehicle 1. The front radar 120 may calculate the relative distance to the object on the basis of the phase difference (or time difference) between the transmission radio waves and the reflected radio waves, and calculate the relative velocity of the object on the basis of the frequency difference between the transmission radio waves and the reflected radio waves.

The front radar 120 may be connected to the controller 150 through a vehicle communication network NT, a hard wire, or a printed circuit board. The front radar 120 may transmit the front radar data to the controller 150.

The front radar 120 may be installed at a position where information about the front of the vehicle 1 may be obtained, and for example, may be installed on a grille or bumper of the vehicle 1.

The plurality of corner radars 130 includes a first corner radar 131 installed on the front right side of the vehicle 1, a second corner radar 132 installed on the front left side of the vehicle 1, a third corner radar 133 installed on the rear right side of the vehicle 1, and a fourth corner radar 134 installed on the rear left side of the vehicle 1.

The first corner radar 131 may have a field of sensing 131a directed toward the front right side of the vehicle 1 as shown in FIG. 3. The first corner radar 131 may be installed on the right side of the front bumper of the vehicle 1, for example. The second corner radar 132 may have a field of sensing 132a directed toward the front left side of the vehicle 1, and may be installed on the left side of the front bumper of the vehicle 1, for example. The third corner radar 133 may have a field of sensing 133a directed toward the rear right side of the vehicle 1 and may be installed on the right side of the rear bumper of the vehicle 1, for example. The fourth corner radar 134 may have a field of sensing 134a directed toward the rear left side of the vehicle 1 and may be installed on the left side of the rear bumper of the vehicle 1, for example.

Each of the first, second, third and fourth corner radars 131, 132, 133, and 134 may include a transmission antenna and a reception antenna. The first, second, third, and fourth corner radars 131, 132, 133 and 134 obtain first corner radar data, second corner radar data, third corner radar data, and fourth corner radar data, respectively. The first corner radar data may include distance information and velocity information regarding another vehicle, a pedestrian, or a cyclist (hereinafter referred to as "an object") positioned on the front right side of the vehicle 1. The second corner radar data may include distance information and velocity information regarding an object positioned on the front left side of the vehicle 1. The third and fourth corner radar data may respectively include distance and velocity information regarding an object located on the rear right side of the vehicle 1 and distance and velocity information regarding an object located on the rear left side of the vehicle 1.

Each of the first, second, third, and fourth corner radars 131, 132, 133 and 134 may be connected to the controller 150 through a vehicle communication network NT, a hard wire, or a printed circuit board, for example. The first, second, third, and fourth corner radars 131, 132, 133, and 134 may respectively transmit the first corner radar data, the second corner radar data, the third corner radar data, and the fourth corner radar data to the controller 150.

The radar 102a including the above-described front radar 120 and a plurality of corner radars 130 may transmit front radar data of the front radar 120 and corner radar data of the plurality of corner radars 130 to the controller 150.

The controller 150 may include the ECU (101b in FIG. 1) of the camera module (101 in FIG. 1) and/or the ECU (102b in FIG. 1) of the radar module (102 in FIG. 1), and/or an integrated ECU.

The controller 150 includes a processor 151 and a memory 152.

The processor 151 may process the external image data of the front camera 111, the radar data of the radar 102a and the corner radar data of the plurality of corner radars 130, and generate a driving signal, a braking signal and a steering signal for controlling the vehicle velocity control system 200 and the steering system 42. For example, the processor 151 may include an image signal processor for processing external image data of the front camera 111 and/or a digital signal processor for processing radar data of the radars 102a and/or a micro control unit (MCU) for generating a driving signal, a braking signal and a steering signal.

The processor 151 may sense objects (e.g., another vehicle, a pedestrian, a cyclist, and the like) in front of or on the side of the vehicle 1 on the basis of the external image data of the front camera 111 and the front radar data of the front radar 102a.

Specifically, the processor 151 may obtain position information (distance and direction) and velocity information (relative velocity) of objects in front or rear of the vehicle 1 based on the radar data of the radar 102a. The processor 151 may obtain position information (direction) and type information (eg, whether the object is another vehicle, a pedestrian, or a cyclist) of objects in front or rear of the vehicle 1 based on the external image data of the front camera 111 or the rear camera 112. In addition, the processor 151 allows the object sensed by the external image data to match the object sensed by the radar data, and obtains the type information, the position information, and the velocity information of the surrounding objects of the vehicle 1 on the basis of a result of the matching.

The processor 151 may generate a driving signal, a braking signal, and a steering signal based on type information, position information, and velocity information of surrounding objects.

For example, the processor 151 calculates a time to collision TTC between the vehicle 1 and the surrounding object on the basis of the position information (distance) and the velocity information (relative velocity) of the surrounding object, and warns the driver of a collision or transmits a braking signal to the vehicle velocity control system 200 on the basis of a result of comparing the TTC with a predetermined reference time. In response to the TTC less than a predetermined first reference time, the processor 151 may allow an alert to be output via audio and/or display. In response to the TTC less than a predetermined second reference time, the processor 151 may transmit a preliminary-braking signal to the vehicle velocity control system 200. In response to the TTC less than a predetermined third reference time, the processor 151 may transmit an emergency braking signal to the vehicle velocity control system 200. In this case, the second reference time is shorter than the first reference time, and the third reference time is shorter than the second reference time.

As another example, the processor 151 may calculate a distance to collision (DTC) on the basis of the relative velocity of surrounding objects, and warn the driver of a collision or transmit a braking signal to the vehicle velocity control system 200 on the basis of a result of comparing the DTC with distances to the surrounding objects.

The processor 151 may obtain position information (distance and direction) and velocity information (relative velocity) of the objects on the sides of the vehicle 1 (front right, front left, rear right, and rear left) on the basis of corner radar data of the plurality of corner radars 130.

As such, the controller 150 may transmit a control signal to the vehicle velocity control system 200 or the steering system 300 based on whether a collision with a front or side object is predicted.

When a collision with a side object is predicted, the controller 150 may perform longitudinal avoidance by transmitting a braking signal to the vehicle velocity control system 200 in order to avoid a collision with the side object. When a collision with a side object is predicted even after transmitting a braking signal for longitudinal avoidance, the controller may perform lateral avoidance by transmitting a steering signal to the steering system 300 in order to avoid collision with a lateral object.

In addition, when the side object does not exist or the collision with the side object is not predicted, the controller 150 may transmit a steering signal to the steering system 300 in order to avoid a collision with the front object. When a collision with a side object is predicted after steering, the controller 150 may not transmit a steering signal to the steering system 300.

When a collision with a rear object is predicted, the controller 150 may increase the vehicle velocity by transmitting a driving signal to the vehicle velocity control system 200 in order to avoid a collision with a rear object. That is, the controller 150 may perform longitudinal avoidance with respect to the rear object. When a collision with a lateral object is predicted even after transmitting the driving signal for longitudinal avoidance, the controller 150 may perform lateral avoidance by transmitting a steering signal to the steering system 300 in order to avoid collision with a lateral object.

The memory 152 stores programs and/or data for processing image data by the processor 151, programs and/or data for processing radar data by the processor 151, and programs and/or data for generating a driving signal, a braking signal and/or a steering signal by the processor 151.

The memory 152 may temporarily store the image data received from the front camera 111 or the rear camera 112 and/or the radar data received from the radars 120, 130 and 140, and may temporarily store a result of processing the image data and/or the radar data of the processor 151.

The memory 152 may include a volatile memory, such as an S-RAM, a D-RAM, and the like, and a non-volatile memory, such as a flash memory, a read only memory (ROM), an erasable programmable read only memory (EPROM), and the like.

At least one component may be added or deleted corresponding to the performance of the components of the vehicle 1 shown in FIGS. 1 and 2. In addition, it will be readily understood by those of ordinary skill in the art that the mutual positions of the components may be changed corresponding to the performance or structure of the system.

Meanwhile, each of the components shown in FIGS. 1 and 2 refers to software and/or hardware components such as a Field Programmable Gate Array (FPGA) and an Application Specific Integrated Circuit (ASIC).

FIG. 4 illustrates a camera and a radar included in a conventional driver assistance system.

Referring to FIG. 4, the front camera 110' included in the conventional DAS may have a field of view 110a' facing the front of the vehicle 1'.

Further, the front radar 120 may have a field of sensing 120a' facing the front of the vehicle 1' as shown in FIG. 4.

However, the field of view angles 110a' and 120a' of the front camera 110' or the front radar 120' are limited to the front. Accordingly, it is difficult to obtain information on surrounding objects located outside the range of the limited field of view angles 110a' and 120a'.

For example, when a rear vehicle located at a close distance from vehicle 1' approaches vehicle 1' to the extent that there is a risk of collision, the vehicle joining in such a short distance may not be detected due to the limited field of view angles 110a' and 120a'. Therefore, it is important to prevent collisions with surrounding objects located outside the range of these limited field of view angles 110a' and 120a'.

Hereinafter, the operation of the DAS 100 according to an embodiment for preventing a collision with a rear vehicle by preventing collision due to the limited field of view angle 110a', 120a' of the conventional DAS described above, and by detecting the rear vehicle more quickly will be described in detail.

FIGS. 5 to 9 are diagrams for illustrating an operation for avoiding a collision with a nearby object by the driver assistance system according to an embodiment.

Referring to FIG. 5, a rear vehicle 2 may be located in a driving lane L2 of a vehicle 1 equipped with a DAS 100 according to an embodiment.

The controller 150 may determine whether the rear vehicle 2 changes direction based on at least one of image data obtained by the camera 101a or radar data obtained by the radar 102a.

For example, the controller 150 may detect an on state or an off state of the direction indicator of the rear vehicle 2 based on image data on the rear of the vehicle 1 obtained by the rear camera 112. When the direction indicator of the rear vehicle 2 is off state, the controller 150 may determine that the rear vehicle 2 does not change direction. When the direction indicator of the rear vehicle 2 is on state, the controller 150 may determine that the rear vehicle 2 changes direction.

As another example, the controller 150 may detect a lateral movement of the rear vehicle 2 based on radar data obtained by the rear radar 140. When the rear vehicle 2 maintains a predetermined lateral distance to both lines forming the driving lane L2, the controller 150 may determine that the rear vehicle 2 does not change direction. The controller 150 may determine that the rear vehicle 2 changes direction when the rear vehicle 2 approaches a specific line within a predetermined range.

In addition to the above-described example, the controller 150 may utilize image data by the front camera 111, and may determine whether to change the direction of the rear vehicle 2 by using radar data obtained by the front radar 120 or the plurality of corner radars 130. Description of this is the same as the description of the above-described example.

When it is determined that the rear vehicle 2 does not change direction, the controller 150 may determine whether there is a risk of collision with the rear vehicle 2.

Specifically, the controller 150 may determine whether there is a risk of collision with the rear vehicle 2 based on at least one of image data obtained by the rear camera 112 or radar data obtained by the rear radar 140.

For example, the controller 150 may detect the relative velocity of the rear vehicle 2 based on radar data obtained by the rear radar 140. When the relative velocity of the rear vehicle 2 is more than or equal to a predetermined velocity threshold, the controller 150 may determine that there is a risk of collision with the rear vehicle 2.

As another example, the controller 150 may detect a distance to the rear vehicle 2 based on radar data obtained by the rear radar 140. When the distance between the rear vehicle 2 and vehicle 1 is less than or equal to a predetermined distance, the controller 150 may determine that there is a risk of collision with the rear vehicle 2.

As another example, the controller 150 may detect the size of the rear vehicle 2 based on image data obtained by the rear camera 112. When the size of the rear vehicle 2 is larger than or equal to a predetermined size, the controller 150 may determine that there is a risk of collision with the rear vehicle 2.

In addition to the above-described example, the controller 150 may obtain various parameters necessary to determine the collision risk such as the position, distance, velocity, or relative velocity of the rear vehicle 2 based on the rear camera 112 or rear radar 140. And determining whether there is a risk of collision based on these various parameters may be variously changed or substituted at the level of ordinary skill.

When it is determined that there is a risk of collision with the rear vehicle 2, the controller 150 may identify an avoidance space (free space) for avoiding a collision with the rear vehicle 2 based on at least one of image data or radar data. The controller 150 may control at least one of the vehicle velocity control system 200 or the steering system 300 of the vehicle 1 so that the vehicle 1 moves to the identified avoidance space.

Image data used to identify the avoidance space may be obtained by at least one of the front camera 111 or the rear camera 112, radar data used to identify the avoidance space may be obtained by at least one of the front radar 120, the plurality of corner radars 130, and the rear radar 140.

For example, if the avoidance space S exists in the adjacent lane L1 of the driving lane L2, the controller 150 may control at least one of the vehicle velocity control system 200 or the steering system 300 so that the vehicle 1 moves to a position 1' corresponding to the avoidance space S.

As another example, as shown in FIG. 6, when the avoidance space S' exists in the driving lane L2, the controller 150 may control the vehicle to move to a position 1" corresponding to the avoidance space S'.

Specifically, the controller 150 may allow the relative position of the vehicle 1 with respect to the rear vehicle 2 to move forward by transmitting a drive signal to the engine management system 11 or the transmission control unit 21 to increase the vehicle speed.

Through this, an unexpected collision with the rear vehicle may be prevented, so that user convenience and safety may be increased.

On the other hand, when there are multiple lanes, a case in which a plurality of avoidance spaces may be identified may occur.

As shown in FIG. 7, when the first avoidance space S1 present in the driving lane L2 and the second avoidance space S2 present in the adjacent lane L3 are identified, the controller 150 may select one avoidance space from among a plurality of avoidance spaces.

Specifically, the controller 150 may select one of a plurality of avoidance spaces based on detection information obtained based on at least one of image data or radar data.

In this case, the detection information means information obtained by the camera 102a or the radar 102a to determine the driving environment of the vehicle 1, and may include information on objects located around the vehicle 1. The detection information may include information related to driving, such as relative velocity, distance, and location of the preceding vehicle 3, 4 and 5 or the following vehicle 2. Such detection information may be obtained by at least one of the front camera 111, the rear camera 112, the front radar 120, a plurality of corner radars 130, and the rear radar 140.

For example, detection information may include at least one of the size of the identified avoidance space, the distance between the preceding vehicle 3, 4 and 5 and vehicle 1, the relative velocity of the preceding vehicle 3, 4 and 5, the distance between the vehicles 1 and the rear vehicle 2 and the relative velocity of the rear vehicle 2.

However, in the example of FIG. 7, a plurality of preceding vehicles and one rear vehicle have been described as an example, but the present disclosure is not limited thereto, and detection information may include information on at least one preceding vehicle or at least one rear vehicle.

The controller 150 may select an avoidance space having the largest avoidance space among a plurality of avoidance spaces, and may control at least one of the vehicle velocity control system 200 or the steering system 300 so that the vehicle 1 moves to the largest avoidance space.

The controller 150 may select a second avoidance space S2 having a larger size among the first avoidance space S1 located in the driving lane L2 and the second avoidance space S2 located in the adjacent lane L3, and may control at least one of the vehicle velocity control system 200 or the steering system 300 so that the vehicle 1 moves to the position 1a corresponding to the second avoidance space S2.

In addition, as another example, as shown in FIG. 8, the controller 150 may select an avoidance space having the smallest relative velocity of the rear vehicle 2, 3 and 4 among a plurality of avoidance spaces, and may control at least one of the vehicle velocity control system 200 or the steering system 300 so that the vehicle 1 moves to the selected avoidance space.

When the first avoidance space S1', the second avoidance space S2', and the third avoidance space S3' are identified and the relative velocity of the rear vehicle 4 located in the lane L3 where the third avoidance space S3' exists is the lowest, the controller 150 may select a third avoidance space S3'. The controller 150 may control at least one of the vehicle velocity control system 200 or the steering system 300 so that the vehicle 1 moves to a position 1a' corresponding to the third avoidance space S3'.

The controller 150 may determine the priority of each of the above-described detection information, and may select one avoidance space from among a plurality of avoidance spaces based on the determined priority.

Specifically, the controller 150 may determine the priority of each detection information based on the collision probability. To this end, the controller 150 may calculate a collision probability with the rear vehicle 2 located on the driving road based on image data or radar data. Alternatively, the priority of each detection information may be determined in advance, and may be stored in the memory 152. Alternatively, the priority of each detection information may be input from a user through an input device (not shown), and may be received from an external device through a communication device (not shown).

For example, the controller 150 may preferentially consider the size of the avoidance space in selecting the avoidance space and then utilize the relative velocity of the rear vehicle.

Through this, since it is possible to more safely avoid a collision with the rear vehicle in consideration of the preceding vehicle, the user's convenience and safety may be increased.

Meanwhile, in controlling the vehicle 1 to move to the avoidance space, when the avoidance space exists in the adjacent lane of the driving lane, the behavior of the rear vehicle driving in the adjacent lane may also greatly affect the safety of the user.

As shown in FIG. 9, when the avoidance space is located in the adjacent lane L1 of the driving lane L2, the controller 150 may control movement to the avoidance space based on the behavior of the rear vehicle 3 driving in the adjacent lane L1.

Specifically, the controller 150 may obtain the relative velocity of the rear vehicle 3 driving in the adjacent lane L1 based on image data or radar data. When the relative velocity of the rear vehicle 3 located in the adjacent lane L1 is more than or equal to a predetermined threshold, the controller 150 may control at least one of the vehicle velocity control system 200 or the steering system 300 so that the vehicle 1 moves to the avoidance space after the rear vehicle 3 passes the vehicle 1.

That is, the controller 150 may determine a steering time point (the steering time point includes a lane change time point) according to the relative velocity of the rear vehicle 3 driving in the adjacent lane L1 where the avoidance space exists, and may control at least one of the vehicle velocity control system 200 or the steering system 300 so that the vehicle 1 moves based on the determined steering time point.

Through this, the controller 150 may avoid a collision with the rear vehicle 2 located on the driving road L2 as well as avoid a collision with the rear vehicle 3 located in the avoidance space. Therefore, user convenience and safety may be increased.

FIG. 10 is flowchart illustrating a control method of a driver assistance system according to an embodiment.

Referring to FIG. 10, the DAS 100 according to an embodiment may obtain detection information (911).

In this case, the detection information means information obtained by the camera 102a or the radar 102a to determine the driving environment of the vehicle 1, and may include information on objects located around the vehicle 1. The detection information may include information related to driving, such as relative velocity, distance, and location of the preceding vehicle or the following vehicle. Such detection information may be obtained by at least one of the front camera 111, the rear camera 112, the front radar 120, a plurality of corner radars 130, and the rear radar 140.

The DAS 100 may confirm whether or not a direction change of the rear vehicle is detected based on the detection information (912). In this case, the rear vehicle means a rear vehicle located on the same driving road as vehicle 1.

For example, the DAS 100 may detect an on state or an off state of the direction indicator of the rear vehicle 2 based on image data on the rear of the vehicle 1 obtained by the rear camera 112. When the direction indicator of the rear vehicle 2 is off state, the DAS 100 may determine that the rear vehicle 2 does not change direction. When the direction indicator of the rear vehicle 2 is on state, the DAS 100 may determine that the rear vehicle 2 changes direction.

As another example, the DAS 100 may detect a lateral movement of the rear vehicle 2 based on radar data obtained by the rear radar 140. When the rear vehicle 2 maintains a predetermined lateral distance to both lines forming the driving lane L2, the DAS 100 may determine that the rear vehicle 2 does not change direction. The DAS 100 may determine that the rear vehicle 2 changes direction when the rear vehicle 2 approaches a specific line within a predetermined range.

In addition to the above-described example, the DAS 100 may utilize image data by the front camera 111, and may determine whether to change the direction of the rear vehicle 2 by using radar data obtained by the front radar 120 or the plurality of corner radars 130. Description of this is the same as the description of the above-described example.

When the direction change of the rear vehicle is not detected (NO in 912), the DAS 100 may confirm whether there is a risk of collision with the rear vehicle (913).

Specifically, the DAS 100 may determine whether there is a risk of collision with the rear vehicle 2 based on at least one of image data obtained by the rear camera 112 or radar data obtained by the rear radar 140.

For example, the DAS 100 may detect the relative velocity of the rear vehicle 2 based on radar data obtained by the rear radar 140. When the relative velocity of the rear vehicle 2 is more than or equal to a predetermined velocity threshold, the DAS 100 may determine that there is a risk of collision with the rear vehicle 2.

As another example, the DAS 100 may detect a distance to the rear vehicle 2 based on radar data obtained by the rear radar 140. When the distance between the rear vehicle 2 and vehicle 1 is less than or equal to a predetermined distance, the DAS 100 may determine that there is a risk of collision with the rear vehicle 2.

As another example, the DAS 100 may detect the size of the rear vehicle 2 based on image data obtained by the rear camera 112. When the size of the rear vehicle 2 is larger than or equal to a predetermined size, the DAS 100 may determine that there is a risk of collision with the rear vehicle 2.

In addition to the above-described example, the DAS 100 may obtain various parameters necessary to determine the collision risk such as the position, distance, velocity, or relative velocity of the rear vehicle 2 based on the rear camera 112 or rear radar 140. And determining whether there is a risk of collision based on these various parameters may be variously changed or substituted at the level of ordinary skill.

When there is a risk of collision with a rear vehicle (YES in 913), the DAS 100 may confirm whether an avoidance space (free space) exists based on detection information (914). To this end, the DAS 100 may identify an avoidance space for avoiding a collision with the rear vehicle 2 based on at least one of image data or radar data included in detection information.

When there is an avoidance space (YES in 914), the DAS 100 may perform steering control or velocity control based on the avoidance space (915). Specifically, the DAS 100 may control the steering system 300 or the vehicle velocity control system 200 so that the vehicle 1 moves to a position corresponding to the avoidance space.

Through this, it is possible to provide information on an accurate position or expected behavior of an object around the vehicle, particularly an object present at the rear of the vehicle, thereby preventing an unexpected collision. Accordingly, user convenience and driving safety may be increased.

FIG. 11 is flowchart illustrating a control method of a driver assistance system according to an embodiment.

Referring to FIG. 11, the DAS 100 according to an embodiment may obtain detection information (921), and confirm whether a rear vehicle direction change is detected based on the detection information (922).

When it is determined that the rear vehicle does not change direction (YES in 922), the DAS 100 may confirm whether there is a risk of collision with the rear vehicle (923). When there is a risk of collision with the rear vehicle (YES in 923), the DAS 100 may confirm whether an avoidance space exists (924).

In this case, the descriptions of steps 911 to 914 of FIG. 10 described above may be equally applied to each of steps 921 to 924.

When there is an avoidance space (924), the DAS 100 may confirm whether a plurality of avoidance spaces exist (925). When a plurality of avoidance spaces exist (YES in 925), the DAS 100 may select one of the plurality of avoidance spaces based on detection information (926).

The detection information may include at least one of the size of the identified avoidance space, the distance between the preceding vehicle and vehicle 1, the velocity of the preceding vehicle, the distance between the vehicles 1 and the rear vehicle and the velocity of the rear vehicle.

The DAS 100 may select an avoidance space having the largest avoidance space among a plurality of avoidance spaces, and may control at least one of the vehicle velocity control system 200 or the steering system 300 so that the vehicle 1 moves to the largest avoidance space.

In addition, as another example, the DAS 100 may select an avoidance space having the smallest relative velocity of the rear vehicle among a plurality of avoidance spaces, and may control at least one of the vehicle velocity control system 200 or the steering system 300 so that the vehicle 1 moves to the selected avoidance space.

The DAS 100 may determine the priority of each of the above-described detection information, and may select one avoidance space from among a plurality of avoidance spaces based on the determined priority.

Specifically, the DAS 100 may determine the priority of each detection information based on the collision probability. To this end, the DAS 100 may calculate a collision probability with the rear vehicle 2 located on the driving road based on image data or radar data. Alternatively, the priority of each detection information may be determined in advance, and may be stored in the memory 152. Alternatively, the priority of each detection information may be input from a user through an input device (not shown), and may be received from an external device through a communication device (not shown).

For example, the DAS 100 may preferentially consider the size of the avoidance space in selecting the avoidance space and then utilize the relative velocity of the rear vehicle.

Through this, since it is possible to more safely avoid a collision with the rear vehicle in consideration of the preceding vehicle, the user's convenience and safety may be increased.

Meanwhile, the disclosed embodiments may be implemented in the form of a recording medium storing instructions that are executable by a computer. The instructions may be stored in the form of a program code, and when executed by a processor, the instructions may generate a program module to perform operations of the disclosed embodiments. The recording medium may be implemented as a computer-readable recording medium.

The computer-readable recording medium may include all kinds of recording media storing commands that may be interpreted by a computer. For example, the computer-readable recording medium may be ROM, RAM, a magnetic tape, a magnetic disc, flash memory, an optical data storage device, etc.

The exemplary embodiments of the disclosure have thus far been described with reference to the accompanying drawings. It will be obvious to those of ordinary skill in the art that the disclosure may be practiced in other forms than the exemplary embodiments as described above without changing the technical idea or essential features of the disclosure. The above exemplary embodiments are only by way of example, and should not be interpreted in a limited sense.

According to a driver assistance system and a control method thereof according to an aspect, information on an accurate location or expected behavior of an object around a vehicle, particularly an object existing at the rear of the vehicle, may be provided, thereby preventing unexpected collisions. Accordingly, user convenience and driving safety may be increased.

What is claimed is:

1. A driver assistance system comprising:
a camera disposed on the vehicle to have an external field of view of a vehicle and configured to obtain image data;
a radar sensor disposed on the vehicle to have a field of sensing outside the vehicle and configured to obtain radar sensor data; and
a controller comprising a processor configured to process the image data and the radar sensor data,
wherein the controller is configured to determine whether a rear vehicle changes direction based on the image data obtained by the camera, determine whether there is a risk of collision with the rear vehicle based on the radar sensor data when the rear vehicle does not change direction and control at least one of a steering system or a vehicle velocity control system of the vehicle to avoid the rear vehicle when it is determined that there is a risk of collision with the rear vehicle,
the controller determines whether the rear vehicle changes direction according to at least one of an on or off state of a direction indicator of the rear vehicle obtained based on the image data or a lateral movement of the rear vehicle obtained based on the radar sensor data,
the controller is further configured to:
identify a plurality of avoidance spaces for avoiding a collision with the rear vehicle based on at least one of the image data or the radar sensor data when it is determined that there is a risk of collision with the rear vehicle,
select one of the plurality of avoidance spaces based on detection information obtained from at least one of the image data or the radar sensor data, the detection information comprising at least one of sizes of the identified avoidance spaces, a distance between a preceding vehicle and the vehicle, a velocity of the preceding vehicle, a distance between the rear vehicle and the vehicle, or a relative velocity of the rear vehicle, and
determine a priority of each of the obtained detection information, select one avoidance space from among the plurality of avoidance spaces based on the determined priority, and control at least one of the steering system or the vehicle velocity control system of the vehicle so that the vehicle moves to the selected avoidance space.

2. The driver assistance system according to claim 1, wherein the controller is configured to determine the steering time point based on the relative velocity of the rear vehicle driving the adjacent lane when the avoidance space exists in the adjacent lane and control the steering system of the vehicle based on the determined steering time point.

3. The driver assistance system according to claim 1, wherein the controller is configured to determine that there is a risk of collision with the rear vehicle when the position or relative velocity of the rear vehicle obtained based on the radar sensor data satisfies a predetermined condition.

4. The driver assistance system according to claim 1, wherein the camera comprises a rear camera disposed on the vehicle to have a rear field of view.

5. The driver assistance system according to claim 1, wherein the radar sensor comprises a rear radar sensor disposed on the vehicle to have a rear field of sensing.

6. The driver assistance system according to claim 1, wherein the controller determines that there is a risk of collision with the rear vehicle based on a size of the rear vehicle.

7. The driver assistance system according to claim 1, wherein the controller determines the priority of each detection information based on a collision probability.

8. The driver assistance system according to claim 1, wherein the controller sets the priority of the sizes of the identified avoidance spaces to be higher than the priority of the relative velocity of the rear vehicle, and controls the at least one of the steering system or the vehicle velocity control system of the vehicle based on the set priority between the sizes of the identified avoidance spaces and the relative velocity of the rear vehicle.

9. A control method of a driver assistance system mounted on a vehicle, the method comprising:
obtaining image data by a camera disposed on the vehicle to have an external field of view of a vehicle;
obtaining radar sensor data by a radar sensor disposed on the vehicle to have a field of sensing outside the vehicle;
processing the image data and the radar sensor data;
determining whether a rear vehicle changes direction based on the image data;
determining whether there is a risk of collision with the rear vehicle based on the radar sensor data when the rear vehicle does not change direction; and
controlling at least one of a steering system or a vehicle velocity control system of the vehicle to avoid the rear vehicle when it is determined that there is a risk of collision with the rear vehicle,
wherein the determining whether a rear vehicle changes direction comprises:
determining whether the rear vehicle changes direction according to at least one of an on or off state of a direction indicator of the rear vehicle obtained based on the image data or a lateral movement of the rear vehicle obtained based on the radar sensor data,
wherein the controlling at least one of a steering system or a vehicle velocity control system comprises:
identifying a plurality of avoidance spaces for avoiding a collision with the rear vehicle based on at least one of the image data or the radar sensor data when it is determined that there is a risk of collision with the rear vehicle,
selecting one of the plurality of avoidance spaces based on detection information obtained from at least one of the image data or the radar sensor data, the detection information comprising at least one of sizes of the identified avoidance spaces, a distance between a preceding vehicle and the vehicle, a velocity of the preceding vehicle, a distance between the rear vehicle and the vehicle, or a relative velocity of the rear vehicle, and
determining a priority of each of the obtained detection information, selecting one avoidance space from among the plurality of avoidance spaces based on the determined priority, and controlling at least one of the steering system or the vehicle velocity control system of the vehicle so that the vehicle moves to the selected avoidance space.

10. The control method according to claim 9, wherein the controlling at least one of the steering system or the vehicle velocity control system of the vehicle so that the vehicle moves to the identified avoidance space comprises:
determining the steering time point based on the relative velocity of the rear vehicle driving the adjacent lane when the avoidance space exists in the adjacent lane; and
controlling the steering system of the vehicle based on the determined steering time point.

11. The control method according to claim 9, wherein the determining whether there is a risk of collision with the rear vehicle comprises:
determining that there is a risk of collision with the rear vehicle when the position or relative velocity of the rear vehicle obtained based on the radar sensor data satisfies a predetermined condition.

12. The control method according to claim 9, wherein the determining whether there is a risk of collision with the rear vehicle comprises:
determining that there is a risk of collision with the rear vehicle based on a size of the rear vehicle.

13. The control method according to claim 9, wherein the controlling at least one of a steering system or a vehicle velocity control system further comprises:
determining the priority of each detection information based on a collision probability.

14. The control method according to claim 9, wherein the controlling at least one of a steering system or a vehicle velocity control system further comprises:
setting the priority of the sizes of the identified avoidance spaces to be higher than the priority of the relative velocity of the rear vehicle; and
controlling the at least one of the steering system or the vehicle velocity control system of the vehicle based on the set priority between the sizes of the identified avoidance spaces and the relative velocity of the rear vehicle.

15. A non-transitory computer-readable medium storing computer-executable instructions, which when executed by a processor, cause the processor to:
obtain image data;
obtain radar sensor data;
process the image data and the radar sensor data;
determine whether a rear vehicle changes direction based on the image data;
determine whether there is a risk of collision with the rear vehicle based on the radar sensor data when the rear vehicle does not change direction; and
control at least one of a steering system or a host vehicle velocity control system of the host vehicle to avoid the rear vehicle when it is determined that there is a risk of collision with the rear vehicle,
wherein the medium further stores instructions, which when executed by the processor, cause the processor to:
determine whether the rear vehicle changes direction according to at least one of an on or off state of a direction indicator of the rear vehicle obtained based on the image data or a lateral movement of the rear vehicle obtained based on the radar sensor data,
identify a plurality of avoidance spaces for avoiding a collision with the rear vehicle based on at least one of the image data or the radar sensor data when it is determined that there is a risk of collision with the rear vehicle;

select one of the plurality of avoidance spaces based on detection information obtained from at least one of the image data or the radar sensor data, the detection information comprising at least one of sizes of the identified avoidance spaces, a distance between a preceding vehicle and the vehicle, a velocity of the preceding vehicle, a distance between the rear vehicle and the vehicle, or a relative velocity of the rear vehicle; and determine a priority of each of the obtained detection information, select one avoidance space from among the plurality of avoidance spaces based on the determined priority, and control at least one of the steering system or the vehicle velocity control system of the vehicle so that the vehicle moves to the selected avoidance space.

16. The non-transitory computer-readable medium of claim 15, further storing instructions, which when executed by the processor, cause the processor to:

determine the steering time point based on the relative velocity of the rear vehicle driving the adjacent lane when the avoidance space exists in the adjacent lane; and control the steering system of the host vehicle based on the determined steering time point.

17. The non-transitory computer-readable medium of claim 15, further storing instructions, which when executed by the processor, cause the processor to:

determine the priority of each detection information based on a collision probability.

18. The non-transitory computer-readable medium of claim 15, further storing instructions, which when executed by the processor, cause the processor to:

sett the priority of the sizes of the identified avoidance spaces to be higher than the priority of the relative velocity of the rear vehicle; and control the at least one of the steering system or the vehicle velocity control system of the vehicle based on the set priority between the sizes of the identified avoidance spaces and the relative velocity of the rear vehicle.

* * * * *